US010462643B1

(12) United States Patent
Chiang et al.

(10) Patent No.: US 10,462,643 B1
(45) Date of Patent: Oct. 29, 2019

(54) CALL SETUP LOGIC WITH EMERG-REQUEST-NON-100 TIMER

(71) Applicant: T-Mobile USA, Inc., Bellevue, WA (US)

(72) Inventors: Hsin-Fu Henry Chiang, Bellevue, WA (US); Boris Antsev, Bothell, WA (US); William Michael Hooker, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/374,639

(22) Filed: Apr. 3, 2019

Related U.S. Application Data

(60) Provisional application No. 62/652,777, filed on Apr. 4, 2018.

(51) Int. Cl.
*H04W 4/90* (2018.01)
*H04L 29/06* (2006.01)
*H04W 80/10* (2009.01)

(52) U.S. Cl.
CPC ........... *H04W 4/90* (2018.02); *H04L 65/1069* (2013.01); *H04W 80/10* (2013.01)

(58) Field of Classification Search
CPC ............. H04L 65/1006; H04L 65/1016; H04L 65/1069; H04L 69/28; H04L 1/188; H04W 36/0022; H04W 80/10; H04W 4/90; H04W 76/10; H04W 76/18; H04W 84/042; H04W 76/38; H04W 76/50; H04W 80/00
See application file for complete search history.

(56) References Cited

U.S. PATENT DOCUMENTS

| 9,294,618 B2* | 3/2016 | Keller ................ H04L 65/1016 |
| 10,154,371 B1* | 12/2018 | Rahat ................ H04L 65/1016 |
| 10,244,574 B2* | 3/2019 | Chiang ............ H04W 36/0022 |
| 2005/0237999 A1* | 10/2005 | Shores .................... H04L 1/188 370/352 |
| 2007/0060097 A1* | 3/2007 | Edge ................ H04L 29/06027 455/404.1 |
| 2010/0088419 A1 | 4/2010 | Phelps et al. |
| 2011/0099281 A1 | 4/2011 | Bakker et al. |
| 2013/0138821 A1 | 5/2013 | Robbins |
| 2014/0024331 A1 | 1/2014 | Hsu et al. |

(Continued)

OTHER PUBLICATIONS

PCT Search Report and Written Opinion dated Jul. 9, 2019 for PCT Application No. PCT/US19/25658, 9 pages.

*Primary Examiner* — Matthew C Sams
(74) *Attorney, Agent, or Firm* — Lee & Hayes, P.C.

(57) ABSTRACT

Multiple timers used by a device during setup of a communication session may include a first timer and a second timer, each configured to expire after different periods of time, and each configured to start in response to the device sending a Session Initiation Protocol (SIP) request using a SIP INVITE method. The first timer is stopped on receipt of the first SIP response, which may include a 100 Trying SIP response, while the second timer is stopped on receipt of a non-100 Trying SIP response. If the first timer expires, the device may send an additional SIP request using the SIP INVITE method as a retry mechanism while the second timer continues to run. If the second timer expires, the device may halt the session setup and reattempt using a different type of access network.

20 Claims, 6 Drawing Sheets

(56) References Cited

U.S. PATENT DOCUMENTS

| | | |
|---|---|---|
| 2016/0286038 A1 | 9/2016 | Georgiou et al. |
| 2017/0005914 A1* | 1/2017 | Edge ........................ H04W 4/90 |
| 2017/0366954 A1 | 12/2017 | Sabeur et al. |
| 2018/0234943 A1* | 8/2018 | Zakaria ................. H04W 68/02 |
| 2018/0263066 A1* | 9/2018 | Chiang ............. H04W 36/0022 |
| 2018/0263068 A1* | 9/2018 | Chiang ............. H04W 36/0022 |
| 2018/0352408 A1* | 12/2018 | Baer ........................ H04W 4/90 |
| 2019/0037451 A1* | 1/2019 | Chaponniere ......... H04W 76/38 |
| 2019/0141772 A1* | 5/2019 | Chiang ............. H04W 36/0022 |

\* cited by examiner

CALL SETUP LOGIC WITH EMERG-REQUEST-NON-100 TIMER

CROSS REFERENCE TO RELATED APPLICATIONS

This U.S. patent application claims priority to provisional U.S. patent application No. 62/652,777, entitled "MULTIPLE IMS CALL SETUP REQUESTS WITHIN THE FIRST NON-PROXY CLIENT RESPONSE TIMER LOGIC," and filed on Apr. 4, 2018, the entirety of which is incorporated herein by reference.

BACKGROUND

When a user dials 911 (in the United States) on his/her user equipment (UE), the call is routed to an appropriate (e.g., nearest) public safety answering point (PSAP). Although today's telecom networks are fairly reliable, the UE, in some instances, may experience delays in establishing an emergency call with a PSAP. This can be due to various issues that arise from time-to-time inhibiting establishment of a communication session with the PSAP. For example, a network outage may occur during a particular emergency call attempt. In another example, such as during a natural disaster, incoming calls to the PSAP may be at such a high volume that calls may not get through to the PSAP, leading to prolonged ringing and delayed answering. The average user can only tolerate a certain amount of call silence time (e.g., 15 seconds to 25 seconds of silence) before the user panics or gets frustrated, hangs up the phone, and dials 911 again. Some users even exhibit this kind of behavior despite having heard a pre-recorded message encouraging the user to stay on the line and wait for the call to be answered.

However, rather than waiting an indefinite period of time for a network issue to resolve itself, the UE is typically configured to utilize call setup timers that timeout if something that is expected to occur during call setup does not occur within a set period of time. Accordingly, after a call setup timer is started, the UE can wait a set period of time until the timer expires, and thereafter take some remedial action. However, existing emergency call setup timers are problematic due to their configurations. For example, existing emergency call setup timer configurations can cause a spike in the amount of network traffic to/from the PSAP, thereby stressing the PSAP and making it difficult for the PSAP to recover, which may, in turn lead to dropped emergency calls. In view of the foregoing, emergency calls may go unanswered and emergency response services may be compromised. In recognizing that the aforementioned problems are, at least partly, caused by poorly-designed emergency call setup timers, there is a need for further improvements to UE call setup procedures utilizing timers for setting up emergency calls.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 1A shows a scenario where the second timer (of multiple timers) is stopped before it expires, and the communication session is successfully established.

DETAILED DESCRIPTION

Figure 1A:
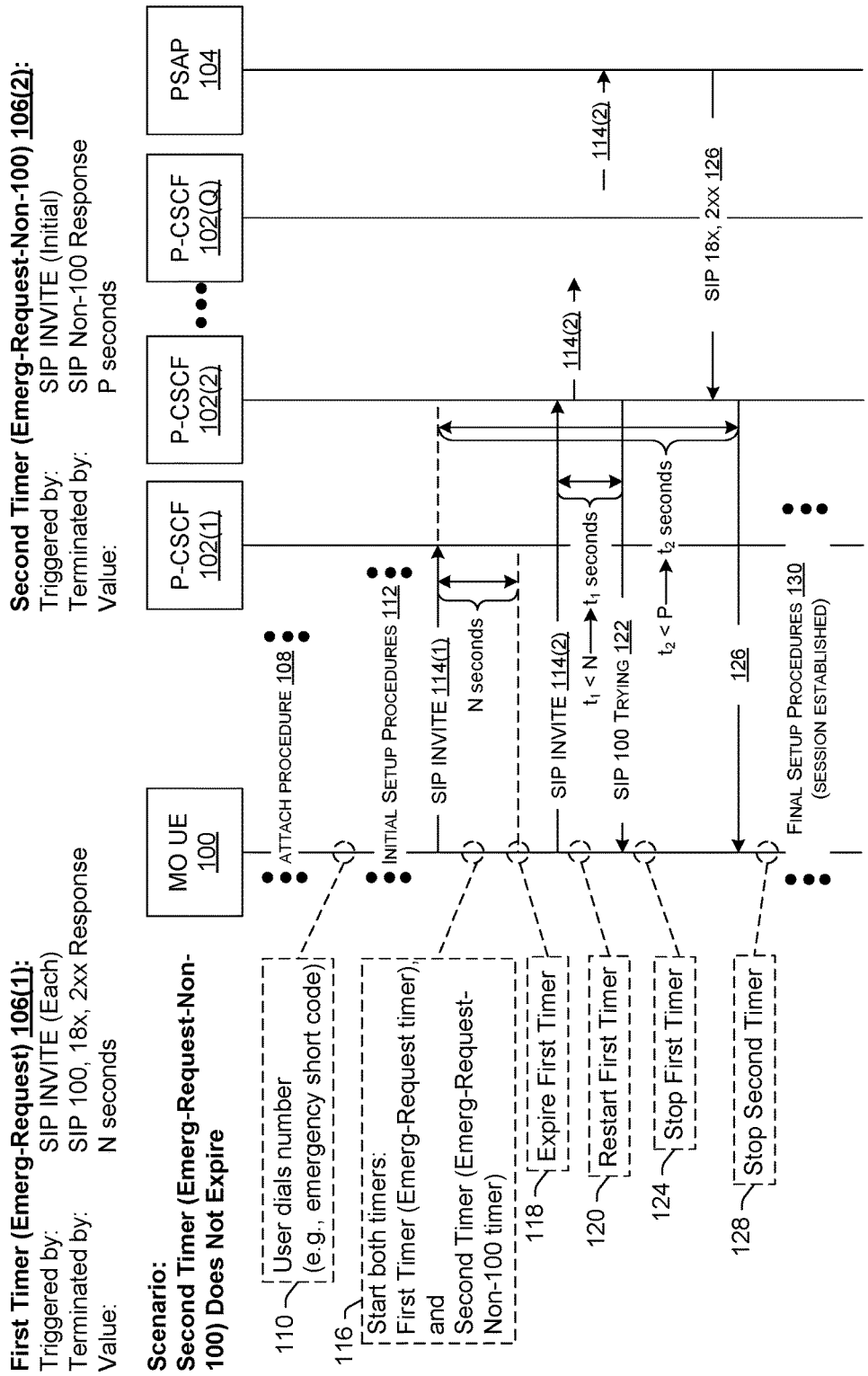
FIG. 1A is a diagram illustrating example signaling between an originating UE, example network nodes, and a public safety answering point (PSAP) during setup of a communication session, and the use of session setup timers, according to various embodiments.

Described herein are techniques and systems for implementing timers during setup of a communication session. These timers are sometimes referred to herein as "session setup timers," or "communication session setup timers," and for calls in particular, "call setup timers." The session setup timers may be started and stopped by particular events, as described herein, which are expected to occur during session setup. In some embodiments, the session setup timers include a first timer and a second timer, which may be individually started and stopped by the same events or by different events, depending on what transpires during setup of the communication session. In some embodiments, these session setup timers are utilized in the setup of an emergency call, such as when the originating UE receives input representing an emergency short code (e.g., 911 in the United States) to establish the emergency call.

The first timer (sometimes referred to herein as an "Emergency Request (Emerg-Request)" timer, or an "E2" timer) is configured to (i) start in response to the originating UE sending a Session Initiation Protocol (SIP) request using the SIP INVITE method, (ii) stop in response to the originating UE receiving at least one of a 100 Trying SIP response, a 18x SIP response, or a 2xx SIP response ("x" being a variable that can be set to any suitable value corresponding to a SIP response specified in the $3^{rd}$ generation partnership project (3GPP) standard), and (iii) expire after a first period of time if the first timer has not already stopped prior to a lapse of the first period of time. The second timer (sometimes referred to herein as an "Emergency Request Non-100 SIP Response (Emerg-Request-Non-100)" timer, an "Emerg-Non-100" timer, an "Emergency Request User Agent Server (Emerg-UAS)" timer, or an "E3" timer) is configured to (i) start in response to the originating UE sending an initial SIP request using the SIP INVITE method, (ii) stop in response to the originating UE receiving a non-100 Trying SIP response, and (ii) expire after a second period of time (which is different from the first period of time associated with the first timer) if the second timer has not already stopped prior to a lapse of the second period of time. A "non-100 Trying" or "non-100" SIP response, as used herein, means a SIP response other than the 100 Trying SIP response. For example, a 18x SIP response (such as a 180 Ringing SIP response, a 183 Session Progress SIP response, etc.) qualifies as a non-100 Trying SIP response. Similarly, a 2xx SIP response (such as a 200 OK SIP response) also qualifies as a non-100 Trying SIP response.

Accordingly, during setup of a communication session, such as an emergency call, the first timer (or Emerg-Request timer) is configured to stop in response to the originating UE receiving the first SIP response from the network, which, in most cases, is the 100 Trying SIP response from a P-CSCF node that is acknowledging receipt of the SIP request (using the SIP INVITE method) via the 100 Trying SIP response. Meanwhile, the second timer (or Emerg-Request-Non-100 timer), which operates in conjunction with the first timer, is configured to stop in response to the first non-100 Trying SIP response from the network, which, in most cases, is the first SIP response originating from the called PSAP (i.e., the terminating endpoint where the SIP request is routed). Accordingly, the second timer provides an upper limit for the total amount of time that the originating UE waits for the PSAP to answer. If the first timer expires, the device may send an additional SIP request(s) using the SIP INVITE method as a retry mechanism while the second timer continues to run. Said another way, while the second timer runs, the first timer may expire one or more times prior to expiration of the second timer. In this sense, the second timer is configured to "survive" multiple SIP dialogues in a scenario where the originating UE sends multiple SIP requests (using the SIP INVITE method) in an effort to establish the communication session. If the second timer expires, the device may halt the session setup and reattempt setup of the communication session using a different type of access network. In some embodiments, in response to expiration of the second timer, the first timer may be stopped (if the first timer has not already stopped at the expiration of the second timer), and the originating UE can halt the retry mechanism, such as by refraining from sending additional SIP requests to available P-CSCF nodes in an attempt to establish the communication session.

Use of the second timer (or Emerg-Request-Non-100 timer) in conjunction with the first timer (or Emerg-Request timer) improves the emergency call experience, as compared to existing used in emergency call setup logic by the originating UE. This is, at least in part, because the session setup techniques described herein cause the originating UE to not abandon an emergency call setup too early in a scenario where the receipt of an expected SIP response (e.g., a non-100 Trying SIP response) from the PSAP is delayed. In other words, the second timer (or Emerg-Request-Non-100 timer) acts as a catch-all timer, causing the originating UE to wait an appropriate amount of time for the first SIP response originating from the PSAP. Accordingly, the second timer (or Emerg-Request-Non-100 timer) causes the originating UE to wait a sufficiently long time for the first SIP response originating from the PSAP, but not so long that the average user will panic or get frustrated and hang up before the UE reattempts the session setup automatically.

An example process to be implemented by a device, such as an originating UE, can include receiving input (e.g., input representing an emergency short code) to establish a communication session (e.g., an emergency call), setting up the communication session, including, sending a SIP request using a SIP INVITE method, and starting a first timer and a second timer in response to sending the SIP request. The first timer is configured to expire after a first period of time and to stop in response to the device receiving a 100 Trying SIP response, and the second timer is configured to expire after a second period of time different from the first period of time and to stop in response to the device receiving a SIP response other than the 100 Trying SIP response. After starting the first timer and the second timer, the device continues setting up the communication session, and, during the continued session setup, if the device receives a non-100 Trying SIP response prior to expiration of the second timer, the device stops at least the second timer, finishes the session setup, and establishes the communication session over a telecommunications network. If, however, the second timer expires prior to the device receiving the non-100 Trying SIP response, the device may halt setting up the communication session, and may reattempt to setup the communication session using a different type of access network than a type of access network previously used by the device.

Also disclosed herein are systems and devices comprising one or more processors and one or more memories, as well as non-transitory computer-readable media storing computer-executable instructions that, when executed, by one or more processors perform various acts and/or processes disclosed herein.

The techniques and systems described herein provide more flexibility in configuring a device to take an appropriate action(s) at an appropriate time(s) during setup of a communication session involving the device. Specifically, utilizing the second timer (or Emerg-Request-Non-100 timer) as a "catch-all" timer in conjunction with the first timer allows the second timer to potentially run over multiple SIP dialogues (e.g., multiple SIP requests sent by the device as "silent redial" retries to multiple different P-CSCF nodes), which, in turn, allows for optimization of UE session setup procedures, particularly for emergency calls. Optimization of UE procedures during session setup of an emergency call may alleviate (e.g., reduce the occurrence of) downstream issues with network nodes and/or terminating endpoints, such as PSAPs. This is, at least in part, because UEs that implement the session setup timer logic described herein are configured to wait for an appropriate amount of time for the network to resolve an issue that is causing a delay in establishing an emergency call with a PSAP. The end result is an improved session experience, an improved likelihood of emergency calls being answered, and an improved likelihood of emergency response services being provisioned to people in need of assistance.

Figure 1B:
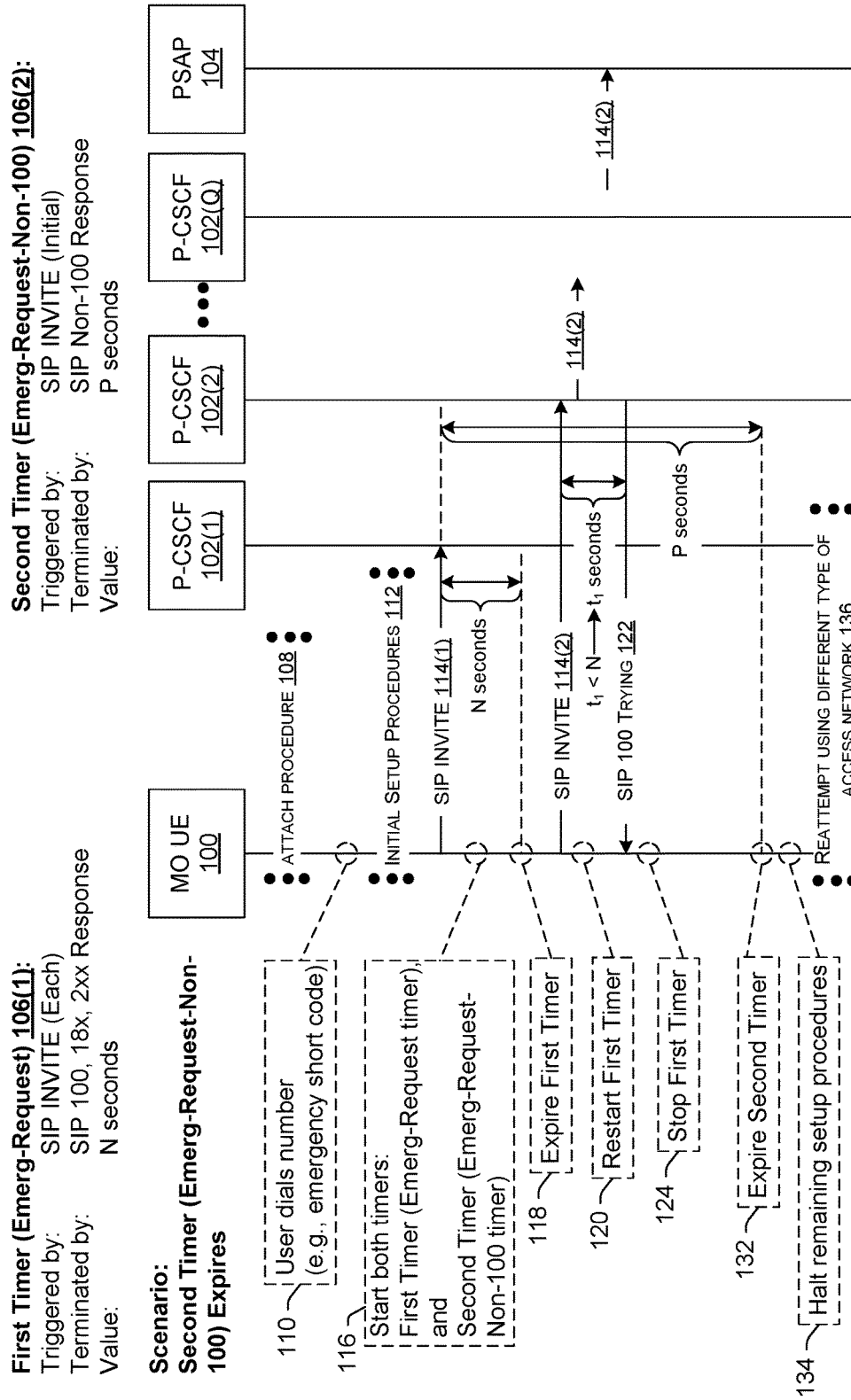
FIG. 1B is a diagram illustrating example signaling using the session setup timers of FIG. 1A, but in a scenario where the second timer expires and the originating UE reattempts session setup using a different type of access network.

FIG. 1A is a diagram illustrating example signaling between an originating UE 100 (designated as "MO UE" 100 in FIG. 1A, "MO" meaning "mobile originated" or "mobile originating"), a plurality of proxy call session control function (P-CSCF) nodes 102(1), 102(2), . . . , 102(Q) (collectively 102), and a public safety answering point (PSAP) 104 during setup of a communication session. FIG. 1A also illustrates the use of session setup timers 106, including a first timer 106(1) and a second timer 106(2). It is to be appreciated that additional session setup timers can be utilized in addition to those illustrated in the figures herein. FIG. 1A shows a scenario where the second timer 106(2) (or Emerg-Request-Non-100 timer) is stopped before it expires, and the communication session is successfully established thereafter. FIG. 1B, on the other hand, illustrates a different scenario where the second timer 106(2) expires during session setup, and the originating UE 100 reattempts to setup the communication session using a different type of access network. It is to be appreciated that the "nodes" depicted in FIGS. 1A and 1B may in fact represent multiple nodes or a single node. It is also to be appreciated that additional nodes may be utilized in the setup of a communication session even though they are not depicted in FIGS. 1A and 1B. For example, and without limitation, multiple serving CSCF (S-CSCF) nodes, application servers, a home subscriber server (HSS), and the like may be involved in the setup of a communication session, as would be recognized by a person having ordinary skill in the art.

In accordance with various embodiments described herein, the terms "user equipment (UE)," "wireless communication device," "wireless device," "communication device," "mobile device," "client device," and "device" may be used interchangeably herein to describe the originating UE 100) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology, including $5^{th}$ Generation (5G) New Radio (NR) network protocols, and/or legacy network technology, such as 2G, 3G, 4G, including circuit-switched networking protocols and/or packet-switched networking protocols. The originating UE 100 may be implemented as any suitable type of computing device configured to communicate over a wireless network, including, without limitation, a mobile phone (e.g., a smart phone/handset), a tablet computer, a laptop computer, a portable digital assistant (PDA), a wearable computer (e.g., electronic/smart glasses, a smart watch, fitness trackers, head-mounted display (HMD), etc.), an in-vehicle (e.g., in-car) computer, and/or any similar mobile device, as well as situated computing devices including, without limitation, a television (smart television), set-top-box (STB), desktop computer, and the like.

In general, a user can utilize the originating UE 100 to communicate with other computing devices of a telecommunications network via an Internet Protocol Multimedia Subsystem (IMS) core. An IMS core is sometimes referred to herein as "IMS core network," "IMS network," "Core Network (CN)," or "IM CN Subsystem". The IMS core is an architectural framework defined by the $3^{rd}$ generation partnership project (3GPP) for delivering Internet Protocol (IP) multimedia to a UE, such as the originating UE 100. The IMS core can be maintained and/or operated by one or more service providers, such as one or more wireless carriers (or "operators"), that provide IMS-based services to users (sometimes called "subscribers") who are associated with UEs, such as the originating UE 100. For example, a service provider may offer multimedia telephony services that allow a subscribed user to call or message other users via an IMS core using his/her UE. A user can also utilize an associated UE to receive, provide, or otherwise interact with various different IMS-based services by accessing computing devices of an IMS core. In this manner, an operator of an IMS core may offer any type of IMS-based service, such as, telephony services, emergency services (e.g., E911), gaming services, instant messaging services, presence services, video conferencing services, social networking and sharing services, location-based services, push-to-talk services, real-time text (RTT) services, and so on. In order to access these services (e.g., emergency services), a UE is configured to request establishment of a communication session. In the case of emergency services, the communication session can comprise a call (i.e., a voice-based communication session, such as a E911 call).

The originating UE 100 is configured to utilize various access networks, including radio access networks (RANs) and/or radio access technologies (RATs), in order to access the IMS core. UEs that are fifth generation (5G) New Radio (NR)-compliant may be configured to communicate with heterogeneous cellular networks by employing radios that can communicate over 5G systems (or "5G networks") as well as over legacy or predecessor systems (or "legacy networks") relative to 5G systems. Similarly, UEs that are fourth generation (4G) LTE-compliant may be configured to communicate within heterogeneous cellular networks by employing radios that can communicate over LTE systems (or "LIE networks") as well as over legacy or predecessor systems (or "legacy networks") relative to 4G systems. Today's legacy networks, such as third generation (3G), and second generation (2G) networks, may employ circuit-switching for voice communications, while 5G and 4G LIE networks employ packet-switching for both data and voice communications in an all-IP data transport technology. In general, 4G LIE-compliant and 5G New Radio (NR)-compliant UEs are configured to prefer attachment to corresponding networks, which offer relatively high data-rate throughput as compared to available legacy or predecessor networks. In most UEs, a choice of which protocol to employ depends primarily on what networks are available to the UE at the UE's present geographic location. Furthermore, in instances where the preferred network (e.g., 4G, 5G, etc.) is unavailable or unusable for any reason, legacy networks, if available, may be used as a fallback protocol, such as by using a circuit-switch fallback (CSFB) mechanism. The originating UE 100 of FIG. 1A can comprise a UE with such capabilities to allow for communication over any type of telecommunications network.

FIG. 1A illustrates that the originating UE 100 may perform an attach procedure 108 in order to attach to a telecommunications network. In instances where a legacy network is available to the originating UE 100, the originating UE 100 can utilize a "combined attach" procedure where the originating UE 100 sends an attachment request by performing registration for services via both a legacy (e.g., circuit-switched) network and a preferred (e.g., packet-switched) network, such as 5G NR or 4G LTE. If successful in the combined attached registration procedure, the result of the attachment request is one where the originating UE 100 is "combined attached," and the originating UE 100 can thereafter implement fallback procedures to reattempt establishment of a communication session via a legacy network in the event that a communication session (e.g., an emergency call) fails, on a preferred network or cannot be provided with sufficient Quality of Service (QoS) (i.e., below a QoS threshold) on the preferred network. If unsuccessful in the combined attach request, or if there is only a single network available (e.g., the UE is at a geographic location within a 5G NR-only coverage area, a 4G LTE-only coverage area, or within another legacy network-only coverage area, etc.), a different result of the attachment request may be one where the originating UE 100 is not combined attached, and is therefore attached to a single network. In either case, an attached UE that has completed the relevant attach procedure 108 will have established a radio link in order to transmit data to, and receive data from, nodes in the telecommunications network, such as the IMS core.

Before attempting to setup and establish a communication session, the originating UE 100 may perform the attach procedure 108, which may include, among other sub-procedures, requesting registration for one or more IMS-based services provided via the IMS core. Registration of the originating UE 100 can involve identifying a proxy CSCF (P-CSCF) node 102 of the IMS core, and sending a registration request via a RAN to an address of the P-CSCF node 102. To register for emergency services, the registration request may include an emergency packet data network (E-PDN) request and an emergency registration (E-Registration or E-REG) request.

As used herein, a "request" is a message that is sent from a UE, such as the originating UE 100, to a network node (e.g., a node of the IMS core, such as a P-CSCF node 102). Meanwhile, a "response" is a message that is sent from a network node to a UE, such as the originating UE 100. This construct may be used when discussing communications that use any particular signaling protocol. For example, Session Initiation Protocol (SIP) may be used by the originating UE 100 for transmitting messages to/from the IMS core. Accordingly, a "SIP request" is a message that is sent from a UE, such as the originating UE 100, to the IMS core using SIP protocol, and a "SIP response" is a message that is sent from the IMS core to a UE, such as the originating UE 100, using SIP protocol. SIP is a signaling protocol that can be used to establish, modify, and terminate multimedia sessions (e.g., a multimedia telephony call, an emergency call, etc.) over packet networks, and to authenticate access to IMS-based services. Accordingly, during the attach procedure 108, the originating UE 100 may send a registration request using the SIP REGISTER method as part of the initial procedures for establishing a multimedia communication session. The IMS core allows for peer-to-peer communications, as well as client-to-server communications over an IP-based network. Accordingly, the IMS core can represent any type of SIP-based network that is configured to handle/process SIP signaling packets or messages.

As shown in FIG. 1A, after the originating UE 100 has performed the attached procedure 108 and is attached to a telecommunications network, a user of the originating UE 100 can initiate a communication session, such as an emergency call. To accomplish this, the user can dial a number, as shown by reference numeral 110 in FIG. 1A. In an emergency scenario, the dialed number can be an emergency short code (e.g., 911 in the United States) that is used for connecting the user to a local PSAP 104. The user action at 110, which is received by the originating UE 100 as input (e.g., user input), causes the originating UE 100 to perform initial setup procedures 112 in an attempt to setup and establish a communication session, such as an emergency call. It is to be appreciated that the user can dial a number in any suitable fashion, such as by selecting an existing contact (e.g., a stored phone number), by dialing a phone number on a keypad (e.g., a soft keypad presented on a touch screen, or a physical keypad of the UE 100 having depressible buttons, etc.), by speaking an utterance (e.g., "Call Nine One One") that is detected by a microphone of the originating UE 100 and understood by voice recognition software, and so on.

In the United States, the user can dial a 10 digit number to make a normal call to another user. 3 digit short codes are also available for a user to access various services, such as "911" for emergency services. In the case of a 3 digit emergency short code ("911" in the United States), the initial setup procedures 112 may include one or more setup procedures that are particular to the emergency type of communication session. For example, the originating UE 100 may send, as part of the initial setup procedures 112 for a E911 call, an emergency packet data network (E-PDN) connection request to a mobility management entity (MME) of the IMS core. Such a request may be sent from the UE 100 using Non-Access Stratum (NAS) protocol. NAS is actually a set of protocols in the Evolved Packet System (EPS), and is used to convey non-radio signaling between a UE, such as the originating UE 100, and the MME for LTE/E-UTRAN access. Continuing with the emergency call example, the initial setup procedures 112 may further include a response (e.g., an E-PDN connected response) from the MME to the originating UE 100 indicating that the UE 100 is connected to the E-PDN. The originating UE 100 may also send an emergency registration (E-REG) request as part of the initial setup procedures 112, and may receive a response to the E-REG request indicating a successful emergency registration.

At least one of the initial setup procedures 112 may include a SIP request 114(1) using the SIP INVITE method. This SIP request 114(1) may be sent from the originating UE 100 to the IMS core, and in particular, to a P-CSCF node 102(1). The SIP request 114(1) represents a communication session request that is to be established with a terminating UE, and it is the initial (or first) SIP request 114(1), which starts a first SIP dialogue. In the case of an emergency call, the terminating UE may comprise a UE at the nearest PSAP 104. It is to be appreciated that, although many of the examples herein are described in the context of an emergency communication sessions, the techniques and systems described herein are not limited to emergency communication sessions, as the techniques and systems are also applicable to a "normal" (i.e., non-emergency) communication session. In a "normal" communication session scenario of FIG. 1A, any emergency-related setup procedures described herein may be omitted or replaced by commensurate non-emergency setup procedures. Nevertheless, the initial setup procedures 112 for a normal (non-emergency) communication session, like the emergency communication session, may include sending the SIP request 114(1) (e.g., the SIP INVITE) from the originating UE 100 to the IMS core (e.g., to a P-CSCF node 102(1)).

It is to be appreciated that the initial setup procedures 112 can include various actions and message transmissions by and between the originating UE 100 and various network nodes in addition to the example actions and message transmission described herein, and that some or all of the example setup procedures 112 may be performed during session setup, depending on the implementation. In general, any suitable setup procedures known to a person having ordinary still in the art can be included in the initial setup procedures 112 of FIG. 1A, which are performed with the aim of establishing a communication session for the originating UE 100 over a telecommunications network. Because network topologies vary between service providing entities, the signaling employed during the attach procedure 108 and the initial setup procedures 112 may vary.

FIG. 1A further illustrates that the originating UE 100 is configured to implement a first timer 106(1) and a second timer 106(2). These timers (collectively 106) are sometimes referred to herein as "session setup timers 106," or "communication session setup timers 106," and for calls in particular, "call setup timers 106," and they have particular properties/characteristics. Again, although many of the examples described herein are described in the context of an emergency call, it is to be appreciated that the timers 106 can be similarly implemented for other types of communication sessions that involve setup procedures similar to those described herein for emergency calls. Furthermore, although two timers 106(1) and 106(2) are described, it is to be appreciated that the originating UE 100 may implement additional timers 106, each with defined properties/characteristics including, without limitation, a trigger event that starts the timer 106, a termination event that stops the timer 106, a timer value that defines a period of time after which the timer 106 expires, and/or a "fire" action that is taken/performed upon expiration of the timer 106. These timer properties/characteristics will be described in more detail below.

The first timer 106(1) (sometimes referred to as an "Emerg-Request" timer 106(1)) is an example timer that is configured to start whenever the originating UE 100 sends a SIP request using the SIP INVITE method. That is, the first timer 106(1) is configured to start on the initial SIP request using the SIP INVITE method, and to restart in response to the originating UE 100 sending each subsequent SIP request using the SIP INVITE method. Accordingly, when the originating UE 100 sends the first SIP request 114(1) using the SIP INVITE method, the first timer 106(1) is started at 116. This event (i.e., the sending of the SIP request 114(1) using the SIP INVITE method) is an example of what is often referred to herein as a "trigger event." This is because the occurrence of the particular event causes the first timer 106(1) to start (or causes triggering of the first timer 106(1)). Said another way, the first timer 106(1) is started if a particular criterion is satisfied. In the example of FIG. 1A, the criterion for triggering the first timer 106(1) is satisfied when the originating UE 100 sends a SIP request using the SIP INVITE method, such as the SIP request 114(1), the SIP request 114(2), and any subsequent SIP requests using the SIP INVITE method.

The second timer 106(2) (sometimes referred to as an "Emerg-Request-Non-100" timer 106(2)) is an example timer that is configured to start in response to the originating UE 100 sending an initial SIP request using the SIP INVITE method. However, in contrast to the first timer 106(1), the second timer 106(2) is not configured to restart on subsequent SIP requests using the SIP INVITE method, and, hence, the second timer 106(2) "survives" (or runs past) subsequent SIP requests using the SIP INVITE method. Accordingly, FIG. 1A shows that the second timer 106(2) also starts at 116 in response to the originating UE 100 sending the first SIP request 114(1), and the second timer 106(2) continues to run (without restarting) notwithstanding the originating UE 100 sending the second SIP request 114(2). Thus, in response to the originating UE 100 sends the first SIP request 114(1) using the SIP INVITE method, both the first timer 106(1) and the second timer 106(2) are started at 116. Said another way, both the first timer 106(1) and the second timer 106(2) are started if a particular criterion is satisfied. In the example of FIG. 1A, the criterion for triggering both timers 106(1) and 106(2) is satisfied when the originating UE 100 sends an initial SIP request using the SIP INVITE method, such as the first SIP request 114(1).

A timer value defines a period of time (e.g., N seconds for the first timer 106(1) and P seconds for the second timer 106(2), where N # P) after which the timer 106 will expire, as measured from the time of starting the timer 106, which occurs in response to the relevant trigger event for the timer 106. The timer value may be specified in any suitable unit of time (e.g., seconds, milliseconds, minutes, etc.). In some embodiments, the timer value of N seconds for the first timer 106(1) (or Emerg-Request timer) may be within a range of about 5 seconds to 15 seconds. In some embodiments, the timer value of N seconds for the first timer 106(1) is set to a value of 5 seconds. In some embodiments, the timer value of P seconds for the second timer 106(2) (or Emerg-Request-Non-100 timer) may be within a range of about 20 seconds to 300 seconds. Therefore, the timer value, P, for the second timer 106(2) may be greater than the timer value, N, for the first timer 106(1), meaning that the first timer 106(1) will expire before the second timer 106(2) if no relevant termination events occur. In some embodiments, the timer value of P seconds for the second timer 106(2) is set to a value of 25 seconds.

The first timer 106(1) may be stopped (or terminated) in response to the originating UE 100 receiving at least one of (i) a 100 Trying SIP response, (ii) a 18x SIP response, or (iii) a 2xx SIP response, "x" being a variable that can be set to any suitable value corresponding to a valid SIP response specified in the 3GPP standard. For instance, a 18x SIP response may include, without limitation, 180 Ringing response, a 181 Call Being Forwarded response, a 182 Queued response, a 183 Session In Progress response, and a 2xx SIP response may include, without limitation, any 2xx—successful (e.g., a 200 (OK) response indicating successful connection. This event (i.e., the receipt of at least one of a 100 Trying SIP response, a 18x SIP response, or a 2xx SIP response) is an example of what is often referred to herein as a "termination event." This is because the occurrence of the event causes the first timer 106(1) to stop (or terminate). The assumption here is that the termination event occurs before the first timer 106(1) has expired (i.e., before N seconds has lapsed since starting the first timer 106(1)). Said another way, the first timer 106(1) is stopped if a particular criterion is satisfied. In this case, the criterion for stopping the first timer 106(1) is satisfied when the originating UE 100 receives the first response from the network (e.g., which, most often, is a 100 Trying SIP response, but can also be a 18x SIP response or a 2xx SIP response) before the first timer 106(1) expires. FIG. 1A depicts a particular scenario where the originating UE 100 determines that the first timer 106(1) has expired at 118 in response to a lapse of N seconds without receiving at least one of a 100 Trying SIP response, a 18x SIP response, or a 2xx SIP response.

After expiration of the first timer 106(1) at 118, the originating UE 100 may send a second SIP request 114(2) using the SIP INVITE method as part of a second SIP dialogue. This second SIP request 114(2) may be sent to a second, different P-CSCF node 102(2) as part of a retry mechanism the UE 100 employs in an effort to setup the communication session. In some embodiments, the second SIP request 114(2) is sent via E-PDN as a "silent redial" anonymous INVITE over the same PDN (E-PDN) to the next P-CSCF node 102(2). In some embodiments, the originating UE 100 is configured to retry as many times as the number of P-CSCF nodes 102 (e.g., "Q" representing the number of P-CSCF nodes 102) provided by the network, such as the IMS core. For example, after the originating UE 100 attaches via the attach procedure 108, the IMS core may provide, to the originating UE 100, a PDN (e.g., E-PDN for an emergency call) connection response that includes a list of P-CSCF nodes 102(1)-(Q) and their corresponding addresses, in order of priority. This is sometimes called a "PCO list" because the UE 100 may initiate a context activation procedure which carries a PCO field with a request for one or more P-CSCF address(es). The P-CSCF addresses representing the P-CSCF nodes 102(1)-(Q) are returned to the UE 100 in this regard. A P-CSCF address may be in the form of an IP address or a fully qualified domain name (FQDN). Although multiple P-CSCF nodes 102(1)-(Q) are depicted in FIGS. 1A and 1B, it is to be appreciated that the number, Q, of P-CSCF nodes provided to the UE 100 can be a single P-CSCF node 102 or multiple P-CSCF nodes 102. The mechanism for the UE 100 to retry by sending a new SIP request 114 to each P-CSCF node 102 in the list may be employed if the initial SIP request 114(1) is permitted to be authenticated or anonymous. For instance, if the UE 100 can, per local regulations, set the From header field value to Anonymous in a SIP request 114 using the SIP INVITE method, then the aforementioned retry mechanism of sending subsequent SIP requests 114 using the SIP INVITE method to additional P-CSCF nodes 102 may be employed. In some embodiments, retrying by sending the second SIP request 114(2) to the second P-CSCF node 102(2) in the list includes skipping (or omitting) E-registration, so the retry may use the same PDN (E-PDN) for the second SIP request 114(2), making it faster and more efficient by skipping the E-registration. This "shortcut" to an anonymous SIP request may be used with emergency calls, but may not be used in non-emergency calls. In non-emergency calls, a second retry to a second P-CSCF node 102 may include sending an authenticated SIP request 114(2), where the From header value is set to authenticated with corresponding ID.

In response to sending the second SIP request 114(2) to the second P-CSCF node 102(2), the originating UE 100 may restart the first timer 106(1) at 120. This is because the sending of the second SIP request 114(2) is a trigger event for the first timer 106(1). Thus, the timer period of N seconds starts again from the sending of the second SIP request 114(2) until a termination event or the expiration of the first timer 106(1), whichever occurs first. In the example of FIG. 1A, the originating UE 100 receives a 100 Trying SIP response 122, which is received $t_1$ seconds since the first timer 106(1) was restarted at 120, where $t_1$ is less than N seconds, N being the value of the first timer 106(1) that defines the expiration period. In the scenario of FIG. 1A, the first timer 106(1) is stopped at 124 in response to receiving the 100 Trying SIP response 122 prior to expiration of the first timer 106(1). The 100 Trying SIP response 122 received from the second P-CSCF node 102(2) is an acknowledgment from the second P-CSCF node 102(2) that it received the second SIP request 114(2), and that it has forwarded the second SIP request 114(2) to a downstream IMS node for further processing. Eventually, as depicted in FIG. 1A, the second SIP request 114(2) may be received by the PSAP 104, and the PSAP 104 may respond by sending non-100 Trying SIP response 126, which may be a 18x SIP response or a 2xx SIP response. The non-100 Trying SIP response 126 may be relayed back to the originating UE 100 by the second P-CSCF node 102(2).

Meanwhile, the second timer 106(2) has continued to run since the initial SIP invite 114(1) was sent by the originating UE 100 and over the course of the multiple SIP dialogues (e.g., the first SIP dialogue associated with the first SIP request 114(1) and the second SIP dialogue associated with the second SIP request 114(2)). In this example, the receipt, by the originating UE 100, of the non-100 Trying SIP response 126 prior to expiration of the second timer 106(2) is a termination event for the second timer 106(2), and, thus, the second timer 106(2) is stopped at 128. More specifically, the originating UE 100 receives the non-100 Trying SIP response 126 $t_2$ seconds since the second timer 106(2) was started at 116, where $t_2$ is less than P seconds, P being the value of the second timer 106(2) that defines the expiration period. The second timer 106(2) is sometimes referred to as the Emerg-UAS timer because the IMS network's SIP proxy (i.e., a P-CSCF node 102) is rarely a User Agent Server (UAS) on behalf of a PSAP 104 peer, and, hence, the first non-100 Trying SIP response 126 typically originates from the PSAP 104.

After stopping the second timer 106(2) at 128, the originating UE 100 may perform one or more final setup procedures 130 until the communication session is ultimately established. Because the second timer 106(2) is configured to run over potentially multiple SIP dialogues (i.e., to run past multiple SIP requests 114 that the UE 100 sends as a retry mechanism in response to iterative expirations of the first timer 106(1)), the second timer 106(2) works in conjunction with the first timer 106(1) as a catch-all timer that guards the total amount of time the originating UE 100 is allowed to retry by running down the list of P-CSCF nodes 102(1)-(Q).

Like the initial setup procedures 112, the final setup procedures 130 (that occur after the termination event for the second timer 106(2)) can include various actions and message transmissions by and between the originating UE 100 and various network nodes, some of which are described below. It is to be appreciated that the setup procedures enumerated herein are merely examples, and that some or all of these example setup procedures may be performed, along with additional setup procedures known to a person having ordinary skill in the art, during session setup, depending on the implementation. Furthermore, setup procedures can vary by the type of communication session, such as an emergency communication session verses a normal (non-emergency) communication session. Setup procedures may also vary by attachment result, such as combined attached verses not combined attached.

Example setup procedures that may be included in the setup procedures 112 and/or 130 are now described by way of example. For example, an individual setup procedure of the setup procedures 112 and 130 can include, without limitation, the originating UE 100 sending/receiving any SIP request/response to/from the IMS core, such as sending a SIP INVITE request, receiving a 100 Trying response, receiving a 180 Ringing response (indicating that a called party of the terminating UE is being alerted), receiving a 181 Call Being Forwarded response, receiving a 182 Queued response, receiving a 183 Session In Progress response, receiving a SIP response that includes session description protocol (SDP) information (e.g., an SDP answer), receiving a SIP response that includes "early media" (e.g., user data), and/or receiving a final response (most likely as part of the final setup procedures 130) to resolve the setup of the communication session. Such a final SIP response can be in the form of a 2xx—successful (e.g., a 200 (OK) response indicating successful connection), 3xx—redirection, 4xx—client failure, 5xx—server failure, or 6xx—global failure, and so on.

Further examples of the setup procedures 112 and 130 of FIG. 1A include, without limitation, the originating UE 100 sending/receiving any NAS-based request/response to/from an MME, such as sending/receiving a radio resource control (RRC) connection request/response to/from the MME, sending/receiving a RRC connection reconfiguration complete request/response to/from the MME, sending/receiving a request/response to/from the MME indicating that a dedicated EPS bearer has been established, and so on. Further examples of the setup procedures 112 and 130 can include, without limitation, the originating UE 100 sending/receiving any type of UPDATE request/response, sending/receiving any type of "ACK" request/response (e.g., a PRACK message), and so on, to/from any suitable network node.

Setup procedures for a given communication session may vary by implementation, session type (e.g., phone call verses video conference, emergency verses non-emergency call, etc.), attachment result (e.g., combined attached verses not combined attached), network topology, and/or other factors. Accordingly, detailed and exhaustive examples of setup procedures and the order in which they are performed in order to setup a communication session are not described herein, as the various possible setup procedures are generally known to a person having ordinary skill in the art. As such, any given session setup may include some or all of the example setup procedures described herein, performed in a suitable order to establish a communication session, such as an emergency call. It is to be appreciated that a communication session is not successfully established unless and until the originating UE 100 receives a final SIP response in the form of a 2xx response.

Turning to FIG. 1B, there is illustrated an example implementation of the timers 106(1) and 106(2) of FIG. 1A, but in a scenario where the second timer 106(2) (or Emerg-Request-Non-100 timer) expires during session setup (a timer "expiring" is sometimes referred to as the timer "firing"). In the scenario of FIG. 1B, the first timer 106(1) and the second timer 106(2) have both started at 116 in response to the occurrence of the trigger event associated with each timer 106; namely, the originating UE 100 sending an initial SIP request 114(1) using the SIP INVITE method. The description of FIG. 1A up to the point of stopping the first timer 106(1) at 124 applies to FIG. 1B, as the first timer 106(1) is still stopped in response to the originating UE 100 receiving the 100 Trying SIP response 122. In FIG. 1B, however, the termination event for stopping the second timer 106(2) does not occur within P seconds from starting the second timer 106(2) at 116, and the second timer 106(2) expires at 132. Expiration of the second timer 106(2) can be referred to herein as a "timeout," or the second timer 106(2) "firing." When a timer 106 "times out," "expires," or "fires," it means that the period of time defined by the timer value (e.g., P seconds for the second timer 106(2)) has lapsed since starting the timer 106, and without the designated termination event occurring before timeout. In other words, if a timer 106 "times out," "expires," or "fires," it means that the timer 106 was not stopped by the designated termination event within the designated period of time defined by the timer value. In the example of FIG. 1B, the first timer 106(1) expired once because at least one of a 100 Trying SIP response, a 18x SIP response, or a 2xx SIP response was not received by the UE 100 within N seconds from the UE 100 sending the SIP request 114(1) using the SIP INVITE method, and the second timer 106(2) expired because a non-100 Trying SIP response was not received by the UE 100 within P seconds from the UE 100 sending the initial SIP request 114(1) using the SIP INVITE method.

In response to the second timer 106(2) firing/expiring/timing out at 132, the originating UE 100 may perform a designated "fire" action. In some embodiments, the fire action includes the originating UE 100 halting, at 134, any remaining setup procedures that were to be carried out by the originating UE 100 in an attempt to setup and establish the communication session, as well as reattempting the setup of the communication session using a different type of access network at 136. In this manner, the fire action can comprise multiple actions (e.g., halting and reattempting, as shown in FIG. 1B). Halting the remaining setup procedures at 134 may include the originating UE 100 sending a SIP message using the SIP CANCEL method in order to terminate the session setup associated with the first attempt. In some embodiments, reattempting to setup the communication session at 136 may include waiting a predefined period of time and reattempts setup of the communication session after a lapse of the predefined period of time. In some embodiments, the UE 100 can reattempt the setup of the communication session via a different access network (sometimes referred to as a "call path," or a "radio access network (RAN)"). For example, if the UE 100 initially attempted to setup the communication session using a 4G LTE access network, the UE 100, at 136, can reattempt session setup on a different type of access network (relative to the 4G LTE access network), such as a legacy telecommunications network (e.g., a circuit-switched (CS) network, such as 3G or 2G). As another example, the UE 100, at 136, can reattempt the setup of the communication session using a WiFi RAN (e.g., a WiFi Access Point (AP)) for WiFi calling, where the previous attempt used a 3GPP RAN, such as an eNodeB. In some embodiments, the UE 100, at 136, may refrain from performing any new setup procedures, such as when there are no other types of access networks or systems available as a backup, in which case, the UE 100 may resort to dropping the call so that the user is not left waiting an indefinite period of time for a network issue to resolve itself.

The example call setup timers 106(1) and 106(2) depicted in FIGS. 1A and 1B work together such that the second timer 106(2) (or Emerg-Request-Non-100 timer) acts as a catch-all timer, causing the originating UE 100 to wait an appropriate amount of time (e.g., 25 seconds) from sending the initial SIP request 114(1) using the SIP INVITE method for the first non-100 Trying SIP response originating from the PSAP 104. Accordingly, the second timer 106(2) (or Emerg-Request-Non-100 timer) causes the originating UE 100 to wait a sufficiently long time for the first SIP response originating from the PSAP 104, but not so long that the average user will panic or get frustrated and hang up before the UE 100 reattempts the session setup automatically, as shown in FIG. 1B.

Figure 2:
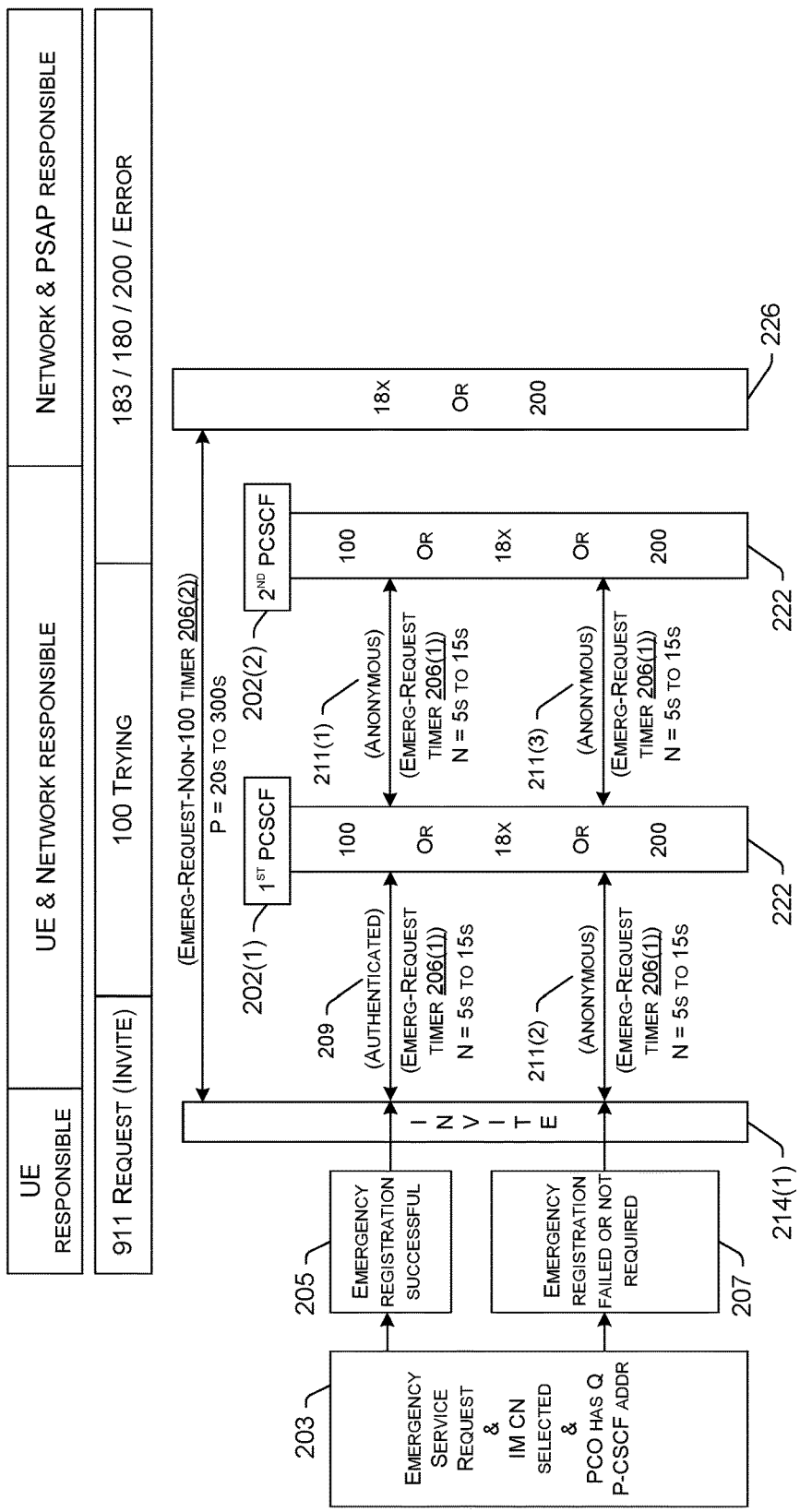
FIG. 2 is a diagram illustrating a technique for setting up an emergency call using multiple timers including a first timer and a second timer, wherein, upon expiration of the first timer, the originating UE is configured to retry the session setup on one or more different proxy call session control function (P-CSCF) nodes while the second timer continues to run, and to do so with an anonymous Session Initiation Protocol (SIP) request using the SIP INVITE method.

FIG. 2 is a diagram illustrating a technique for setting up an emergency call using multiple timers including a first timer 206(1) (which may be the same as, or similar to, the first timer 106(1) described with respect FIGS. 1A and 1B) and a second timer 206(2) (which may be the same as, or similar to, the second timer 106(2) described with respect to FIGS. 1A and 1B). FIG. 2 illustrates that, upon expiration of the first timer 206(1), the originating UE 100 is configured to retry the session setup on one or more different proxy call session control function (P-CSCF) nodes 202 (which may be the same as, or similar to, the P-CSCF nodes 102 described with respect to FIGS. 1A and 1B) while the second timer 206(2) continues to run. FIG. 2 also illustrates that this retry mechanism (i.e., retrying the session setup on one or more different P-CSCF nodes 202) is done with an anonymous emergency SIP request using the SIP INVITE method.

For example, UE 100 may perform an emergency service request 203, whereby the UE 100 may select the IMS core network ("IM CN select") and send, to the IMS core, a request to register for IMS-based emergency services. To register for emergency services at 203, the registration request may include an E-PDN request and an E-REG request. Furthermore, a list of Q P-CSCF nodes 202, such as a PCO list including addresses of a first P-CSCF node 202(1) and a first P-CSCF node 202(2), may be provided to the UE 100 as part of the emergency service request 203.

FIG. 2 shows two possible results of the emergency service request 203, one result being a successful emergency registration 205, and another result being a failed emergency registration 207 (or an emergency registration not required 207). If the result is the successful emergency registration 205, and in response to the user of the UE 100 providing input corresponding to an emergency short code (e.g., 911 in the United States), the UE 100 may request establishment of an emergency call by sending, to a first P-CSCF node 202(1) in the list, an initial SIP request 214(1) using the SIP INVITE method, where the initial SIP request 214(1) is authenticated 209. An authenticated 209 SIP request 214(1) means one that provides an identifier (ID) associated with the user or the UE 100 as part of the SIP request 214(1), such as by setting the From header field value to Authenticated with a corresponding ID. It is to be appreciated that the SIP request 214(1) may be the same as, or similar to, the SIP request 114(1) described with respect to FIGS. 1A and 1B. After sending the authenticated 209 SIP request 214(1), the first timer 206(1) and the second timer 206(2) are both started and begin to run for their respective periods of time (N seconds for the first timer 206(1) and P seconds for the second timer 206(2).

If the first timer 206(1) expires without receiving a SIP response 222 that is at least one of a 100 Trying SIP response, a 18x SIP response, or a 2xx SIP response from the network, the UE 100 may implement a retry mechanism by sending, to a second P-CSCF node 202(2) in the list, a second SIP request using the SIP INVITE method, and the UE 100 may restart the first timer 206(1) in response to sending the second SIP request to the second P-CSCF node 202(2). The second SIP request may be sent via E-PDN as a "silent redial" anonymous 211(1) request over the same PDN (E-PDN) to the next P-CSCF node 202(2). An anonymous 211 SIP request means one that sets the From header field value in the SIP request to anonymous. Some jurisdictions prohibit the use of anonymous SIP requests, such as Japan. In this case, the network may convert the anonymous 211(1) SIP request an authenticated 209 SIP request. That is, the network may insert an ID into the SIP request before it is forwarded to the PSAP 104 to convert the SIP request from an anonymous SIP request to an authenticated SIP request. This ID may be obtained from the initial authenticated 209 SIP request 214(1) that was sent by the UE 100. In response to iterative expirations of the first timer 206(2), the UE 100 may be configured to retry as many times as the number "Q" of P-CSCF addresses provided by the network. Each retry, in these embodiments, may be to a different P-CSCF address or node 202, and each retry may skip (or omit) the E-registration by utilizing the same PDN (E-PDN) used with the first SIP request 214(1). The second timer 206(2) thereby becomes an overall, catch-all timer that guards the total amount of time the UE 100 is allowed to retry on different P-CSCF nodes 202 responsive to iterative expirations of the first timer 206(1).

In the example of FIG. 2, there are two P-CSCF nodes 202(1) and 202(2). After sending the anonymous 211(1) SIP request to the second P-CSCF node 202(2), and if the second timer 206(2) expires without receiving a non-100 Trying SIP response 226, the first timer 206(1) is stopped (if it hasn't already been stopped by a SIP response 222 that includes the 100 Trying SIP response), and the UE 100 refrains from sending additional SIP requests to additional P-CSCF nodes, if any are left to try in the list. Responsive to expiration of the second timer 206(2), the UE 100 also halts the ongoing setup procedures, and reattempts to establish the communication session using a different access network, as described herein.

If the result of the emergency service request 203 is a failed emergency registration 207 or an emergency registration not required 207, and in response to the user of the UE 100 providing input corresponding to an emergency short code (e.g., 911 in the United States), the UE 100 may request establishment of an emergency call by sending, to a first P-CSCF node 202(1) in the list, an initial SIP request 214(1) using the SIP INVITE method, where the initial SIP request 214(1) is anonymous 211(2). The session setup logic is therefore similar to the successful emergency registration 205 result, except that, for the failed emergency registration 207 or the emergency registration not required 207 result, the initial SIP request 214(1) may be anonymous, as described herein. For example, a subsequent SIP request that restarts the first timer 206(1) may also be anonymous 211(3).

Figure 3:
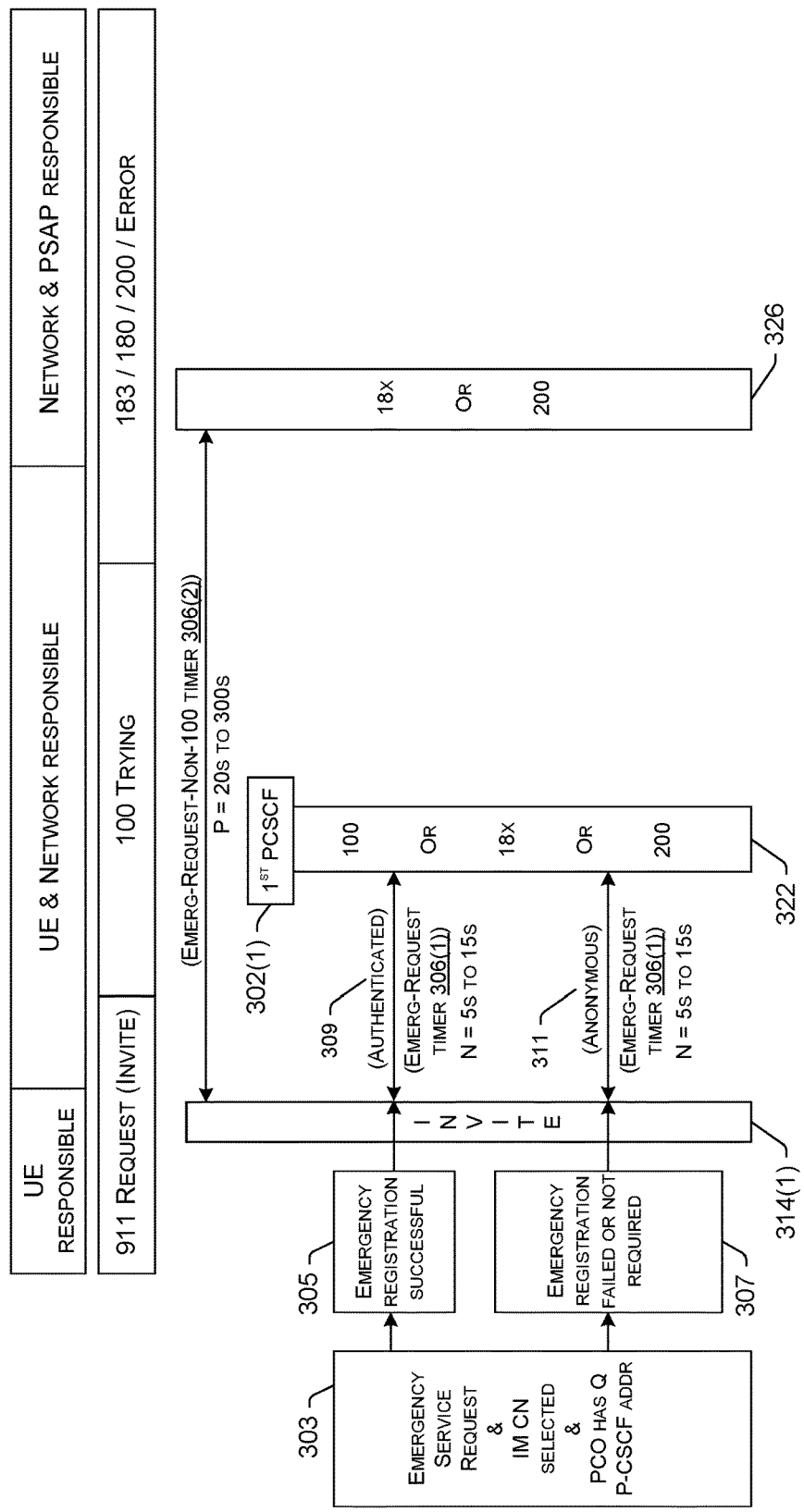
FIG. 3 is a diagram illustrating a technique for setting up an emergency call using multiple timers including a first timer and a second timer, wherein, upon expiration of the first timer, the originating UE does not retry the session setup on a different P-CSCF node.

FIG. 3 is a diagram illustrating a technique for setting up an emergency call using multiple timers including a first timer 306(1) (which may be the same as, or similar to, the first timer 106(1) described with respect FIGS. 1A and 1B) and a second timer 306(2) (which may be the same as, or similar to, the second timer 106(2) described with respect to FIGS. 1A and 1B). In FIG. 3, the UE 100 is not configured to retry the session setup on different P-CSCF nodes 302. In other words, UE logic to retry session setup by sending additional SIP requests using the SIP INVITE method to different P-CSCF nodes (as is the case in FIG. 2) is optional.

For example, UE 100 may perform an emergency service request 303 (which may be the same as, or similar to the emergency service request 203 described with respect to FIG. 2). Again, there may be at least two possible results of the emergency service request 303, one result being a successful emergency registration 305, and another result being a failed emergency registration 307 (or an emergency registration not required 307). If the result is the successful emergency registration 305, and in response to the user of the UE 100 providing input corresponding to an emergency short code (e.g., 911 in the United States), the UE 100 may request establishment of an emergency call by sending, to a first P-CSCF node 302(1), an initial SIP request 314(1) using the SIP INVITE method, where the initial SIP request 314(1) is authenticated 309. After sending the authenticated 309 SIP request 314(1), the first timer 306(1) and the second timer 306(2) are both started and begin to run for their respective periods of time (N seconds for the first timer 306(1) and P seconds for the second timer 306(2).

In FIG. 3, if the first timer 206(1) expires without receiving a SIP response 322 that is at least one of a 100 Trying SIP response, a 18x SIP response, or a 2xx SIP response from the network, the UE 100 may not implement the retry mechanism described with respect to at least FIG. 2, but instead, may wait for the network issue to resolve itself, or may retry on the same P-CSCF node 302(1) after a period of time. In some embodiments, the UE 100 may be configured to wait successively longer periods of time each time the UE 100 tries on the same P-CSCF node 302. The UE 100, in this case, may restart the first timer 306(1) in response to each try on the same P-CSCF node 302(2).

After sending the authenticated 309 SIP request to the P-CSCF node 302(1), and if the second timer 306(2) expires without receiving a non-100 Trying SIP response 326, the first timer 306(1) is stopped (if it hasn't already been stopped by a SIP response 322 that includes the 100 Trying SIP response). Responsive to expiration of the second timer 306(2), the UE 100 also halts the ongoing setup procedures, and reattempts to establish the communication session using a different access network, as described herein.

If the result of the emergency service request 303 is a failed emergency registration 307 or an emergency registration not required 307, and in response to the user of the UE 100 providing input corresponding to an emergency short code (e.g., 911 in the United States), the UE 100 may request establishment of an emergency call by sending, to a first P-CSCF node 302(1), an initial SIP request 314(1) using the SIP INVITE method, where the initial SIP request 314(1) is anonymous 311. The session setup logic is therefore similar to the successful emergency registration 305 result, except that, for the failed emergency registration 307 or the emergency registration not required 307 result, the initial SIP request 314(1) may be anonymous, as described herein.

Table 1, below, shows examples of different session setup timers that can be implemented by an originating UE 100 according to the techniques and systems described herein. Timer "E2" represents an example of the first timer 106(1)/206(1)/306(1) discussed with reference to previous figures, and Timer "E3" represents an example of the second timer 106(2)/206(2)/306(2) discussed with reference to the previous figures. The example call setup timers listed in Table 1 are examples of different implementation techniques, and are not to be considered as an exhaustive list of timers that can be implemented according to the techniques and systems described herein.

TABLE 1

Example Session Setup Timers

| Timer | Procedures | Timer Value(s) | Timer Start | Timer Stop | On Expire | Exception Conditions | Exception Actions |
|---|---|---|---|---|---|---|---|
| E1 | E-PDN + E-REG | 10 | E-PDN Request | INVITE (auth. or anon.) | If E1 timeout is due to no E-PDN response, then follow E1 Exception Conditions A-1 and A-2. If E1 timeout is due to no E-REG response, then follow Timer E1 Exception Condition B NOTE: E-REG no response is only possible when E-PDN successful | A-1. E-PDN Failure (H/EH PLMN) | A-1. If "E-PDN Failure (H/EH PLMN)" then stop timer E1. And if (IMS PDN over cellular radio (LTE, NR, etc.) is available and IMS is registered), then send authenticated INVITE using IMS PDN, E911 over IMS PDM is to disable VoWiFi handover when VoWifi is capable (VoWiFi e911 requirement applicable) Else, CSFB procedure or 2$^{nd}$ EMC attempt domain PLMN selection. (e.g., IMS PDN is not available, IMS PDN not possible due to VoPS is false all fall into this category) |
| | | | | | | A-2. E-PDN Failure (V-PLMN) | A-2. IPv6 PDN Type cause code #31-34, 50 trigger IPv4 fallback. IPv4 PDN request restarts Timer E1. All others (including IPv4 PDN Type) and when the fallback attempt fails, attempt CSFB Procedure or 2$^{nd}$ EMC attempt domain PLMN selection. |
| | | | | | | B. E-REG error (any error, any PLMN) | B. anonymous INVITE to same P-CSCF used by E-REG. e.g., (same P- |

TABLE 1-continued

Example Session Setup Timers

| Timer | Timer Procedures | Timer Value(s) | Timer Start | Timer Stop | On Expire | Exception Conditions | Exception Actions |
|---|---|---|---|---|---|---|---|
| E2 | EMC Setup Initiation | 5 | Each INVITE | SIP 100, 18x, 2xx Response | E2 timeout follows Timer E2 Exception Condition A. | A. 4xx, 5xx, 6xx Error (any PLMN, any PDN) | CSCF) E-REG to P-CSCF #1, INVITE to P-CSCF #1. A. If the INVITE is sent via E-PDN, "silent redial" anonymous INVITE over same PDN (E-PDN) to the next P-CSCF(s) from PCO IE top to bottom resetting timer E2 for each INVITE. Retain E3 Timer. After PCO list exhaustion, CSFB Procedure or 2$^{nd}$ EMC attempt domain PLMN selection. Stop E2 timer. Stop E3 timer. NOTE: Reattempt is to use the same PDN (E-PDN). If the INVITE is sent via IMS PDN, CSFB Procedure or 2$^{nd}$ EMC attempt domain PLMN selection. |
|  |  |  |  |  |  | B. 3xx (only 380 has known use case; others TBD) (any PLMN, any PDN). | B. CSFB Procedure or 2$^{nd}$ EMC attempt domain PLMN selection (Follow 3GPP TS 24.229 for details). Stop E2 timer. Sop E3 timer. |
| E3 | EMC Setup Catch All | 25 | E1 Stop or Expire, except IPV4 fallback per E1 A-2. NOTE: The which means when 1$^{st}$ INVITE is sent out after LTE is selected as the emergency call domain | SIP 18x, 2xx Response | CSFB Procedure or 2$^{nd}$ EMC attempt domain PLMN Selection Stop E3 timer. | A. 4xx, 5xx, 6xx Error (any PLMN, and PDN) | A. If E2 timer is stopped, CSFB Procedure or 2$^{nd}$ EMC attempt domain PLMN selection. Stop E3 timer. If E2 timer is active, follow E2 timer stop exceptions. |
|  |  |  |  |  |  | B. 3xx (only 380 has known use case, others TBD) any PLMN, any PDN) | B. CSFB Procedure or 2$^{nd}$ EMC attempt domain PLMN selection. Stop E2 timer. Sop E3 timer. |

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
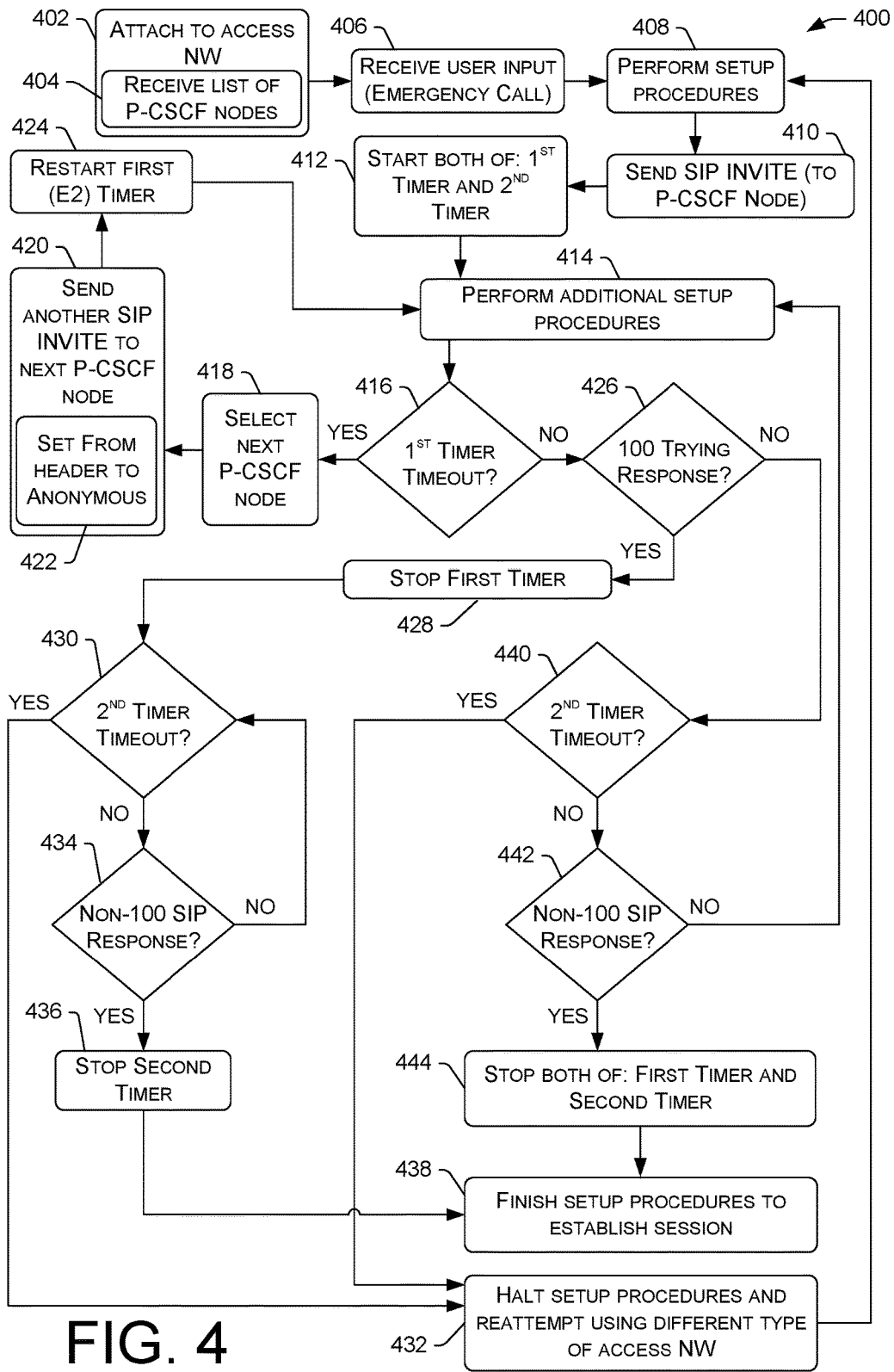
FIG. 4 illustrates a flowchart of an example process of utilizing multiple timers during setup of a communications session, according to various embodiments.

FIG. 4 illustrates a flowchart of an example process 400 of utilizing multiple timers during setup of a communications session, according to various embodiments. The process 400 is described with reference to the previous figures.

At 402, a UE 100 can attach to an access network and register for IMS services. For example, the UE 100 can send an attachment request to establish a radio link with a RAN (e.g., an eNodeB) that is within communication range of the UE 100. The attachment result at block 402 can vary depending on the circumstances. For example, if the UE 100 is at a geographic location that is within a coverage area of a preferred network (e.g., 5G NR) and also a legacy network, the UE 100 can be combined attached, and is thereby able to utilize the legacy network as a fallback measure. In different circumstances, such as when the UE 100 is at a geographic location in LTE-only coverage area, the attach result at block 402 may be a result where the UE 100 is not combined attached (e.g., an EPS-only attach result). In addition to attachment, the UE 100 may send a E-REG request to register for emergency IMS services.

At sub-block 404, the UE 100 may receive a list of P-CSCF nodes 102/202/302 (or P-CSCF addresses, such as IP addresses of P-CSCF nodes 102/202/302). The list of P-CSCF nodes 102/202/302 may be in order of priority such that the UE 100 is to traverse the list from top-to-bottom starting with the first P-CSCF node 102(1)/202(1)/302(1) in the list to establish a communication session.

At 406, the UE 100 may receive input (e.g., user input) requesting to establish a communication session. For example, the input may represent an emergency short code (e.g., 911 in the United States) to establish an emergency call. The manner in which a user initiates a communication session (e.g., a call) can vary according to the examples provided herein. In the context of an emergency call, the user may provide input to a touchscreen of the UE 100, for example, to dial the phone number 9-1-1.

At 408, the UE 100, as an originating UE 100, may perform setup procedures in order to setup the requested communication session. As noted above, the setup procedures may vary by the type of communication session (e.g., emergency verses non-emergency) initiated at block 406, and/or by the attachment result (e.g., combined attached verses not combined attached) at block 402. For example, one or more setup procedures performed at block 408 may precede a SIP request using the SIP INVITE method.

At 410, as part of setting up the communication session, the originating UE 100 may send a SIP request 114(1) using the SIP INVITE method. This SIP request 114(1) may be sent to a first P-CSCF node 102(1)/202(1)/302(1) in a list of P-CSCF nodes 102/202/302 available to the UE 100. In some embodiments, the SIP request 114(1) is an authenticated SIP request 114(1) in that the From header value in the SIP request 114(1) is set to Authenticated, with a corresponding ID associated with the subscribed user or the UE 100.

At 412, in response to sending the SIP request 114(1), the UE 100 may start both a first timer 106(1)/206(1)/306(1) and a second timer 106(2)/206(2)/306(2). The first timer 106(1)/206(1)/306(1) (or Emerg-Request timer) may be configured to expire after a first period of time and to stop in response to the UE 100 receiving at least one of a 100 Trying SIP response, a 18x SIP response, or a 2xx SIP response. The second timer 106(2)/206(2)/306(2) (or Emerg-Request-Non-100 timer) may be configured to expire after a second period of time different from (e.g., greater than) the first period of time and to stop in response to the UE 100 receiving a SIP response other than the 100 Trying SIP response (i.e., a non-100 Trying SIP response). A non-100 Trying SIP response may include, without limitation, a 180 Ringing SIP response, a 183 Session Progress SIP response, or a 200 OK SIP response.

At 414, the originating UE 100 may perform additional setup procedures in order to setup the communication session while monitoring the timers 106/206/306 that were started at block 412. These additional setup procedures may occur after the SIP request 114(1) using the SIP INVITE method.

At 416, the first timer 106(1)/206(1)/306(1) that was started at block 412 can be monitored for timeout prior to the occurrence of a designated termination event that stops the first timer 106(1)/206(1)/306(1). It is to be appreciated that both the first timer 106(1)/206(1)/306(1) and the second timer 106(2)/206(2)/306(2) can be monitored in parallel for respective timeouts, but these monitoring operations are described sequentially in the flow chart of FIG. 4.

If, at block 416, the time period for the first timer 106(1)/206(1)/306(1) expires before the occurrence of the designated termination event (e.g., if the first timer 106(1)/206(1)/306(1) expires without receiving at least one of a 100 Trying SIP response, a 18x SIP response, or a 2xx SIP response), the process 400 may follow the "YES" route from block 416 to block 418, where the originating UE 100 may select or identify the next P-CSCF node 102(2)/202(2)/302(2) in the list of P-CSCF nodes 102/202/302 available to the UE 100.

At 420, the originating UE 100 may send a second SIP request 114(2) using the SIP INVITE method to a second P-CSCF node 102(2)/202(2)/302(2) selected or identified at block 418. In some embodiments, this second SIP request 114(2) may be an anonymous SIP request. Accordingly, at sub-block 422 the From header field value in the second SIP request 114(2) may be set to Anonymous. This may be implemented as a "silent redial" anonymous INVITE over the same PDN (E-PDN) such that the UE 100 skips (or omits) the E-registration step on the second (or any subsequent) retry to the next P-CSCF node 102(2)/202(2)/302(2).

At 424, the UE 100 may restart the first timer 106(1)/206(1)/306(1) (or Emerg-Request timer) in response to sending the second SIP request 114(2) at block 420. After restarting the first timer 106(1)/206(1)/306(1), the process 400 may proceed from block 424 back to block 414 where additional setup procedures are performed in order to setup the communication session while the restarted first timer 106(1)/206(1)/306(1) and the second timer 106(2)/206(2)/306(2) (which has continued to run since the initial SIP request 114(1)) are monitored for timeout or a termination event, whichever occurs first.

Returning to block 416, if the UE 100 determines that the first timer 106(1)/206(1)/306(1) is still running and has not expired, the process 400 may follow the "NO" route from block 416 to block 426, where the UE 100 determines whether a 100 Trying SIP response has been received. If, at block 426, a 100 Trying SIP response 122 is received prior to expiration of the first timer 106(1)/206(1)/306(1), the process 400 may follow the "YES" route from block 426 to block 428, where the UE 100 may stop the first timer 106(1)/206(1)/306(1) in response to receiving the 100 Trying SIP response 122.

At 430, the second timer 106(2)/206(2)/306(2) (or Emerg-Request-Non-100 timer) that was started at block 412 can be monitored for timeout prior to the occurrence of a designated termination event that stops the second timer 106(2)/

206(2)/306(2). If, at block 430, the time period for the second timer 106(2)/206(2)/306(2) expires before the occurrence of the designated termination event (e.g., if the second timer 106(2)/206(2)/306(2) expires without receiving a non-100 Trying SIP response), the process 400 may follow the "YES" route from block 430 to block 432.

At 432, the originating UE 100 may halt setting up the communication session in response to determining that the second timer 106(2)/206(2)/306(2) has expired, and the UE 100 may reattempt to setup the communication session using a different type of access network than a type of access network previously used by the UE 100. This different type of access network may be an access network of a legacy packet-switched network (e.g., going from 5G NR to 4G LTE), or an access network of a legacy circuit-switched network (e.g., falling back to a 3G or 2G circuit-switched network), or a WiFi access network (e.g., utilizing a WiFi AP for WiFi calling). Following block 432, the process 400 may proceed back to block 408 where setup procedures are performed in order to setup the communication session, this time using the different type of access network, and the process 400 iterates from block 408 to perform the reattempt automatically on behalf of the user (i.e., without user intervention).

Returning to block 430, if the UE 100 determines that the second timer 106(2)/206(2)/306(2) is still running and has not expired, the process 400 may follow the "NO" route from block 430 to block 434, where the UE 100 determines whether a non-100 Trying SIP response has been received. If, at block 434, a non-100 Trying SIP response 126 is not received prior to expiration of the second timer 106(2)/206(2)/306(2), the process 400 may follow the "NO" route from block 434 back to block 430, where the UE 100 may continue to monitor for a timeout of the second timer 106(2)/206(2)/306(2) or the occurrence of a termination event (e.g., the receipt of a non-100 Trying SIP response), whichever occurs first. If, at block 434, a non-100 Trying SIP response 126 is received prior to expiration of the second timer 106(2)/206(2)/306(2), the process 400 may follow the "YES" route from block 434 to block 436, where the UE 100 may stop the second timer 106(2)/206(2)/306(2) in response to receiving the non-100 Trying SIP response 126.

At block 438, after the second timer 106(2)/206(2)/306(2) is stopped at block 436, the originating UE 100 can establish the communication session over a telecommunications network. This may involve performing final setup procedures, such as receiving a 200 OK SIP response (if a 200 OK SIP response has not already been received).

Returning to block 426, if a 100 Trying SIP response is not received prior to expiration of the first timer 106(1)/206(1)/306(1), the process 400 may follow the "NO" route from block 426 to block 440.

At 440, the second timer 106(2)/206(2)/306(2) (or Emerg-Request-Non-100 timer) that was started at block 412 can be monitored for timeout prior to the occurrence of a designated termination event that stops the second timer 106(2)/206(2)/306(2). If, at block 440, the time period for the second timer 106(2)/206(2)/306(2) expires before the occurrence of the designated termination event (e.g., if the second timer 106(2)/206(2)/306(2) expires without receiving a non-100 Trying SIP response), the process 400 may follow the "YES" route from block 440 to block 432, where the originating UE 100 may halt setting up the communication session in response to determining that the second timer 106(2)/206(2)/306(2) has expired, and the UE 100 may reattempt to setup the communication session using a different type of access network than a type of access network previously used by the UE 100, and the process 400 may proceed back to block 408 where setup procedures are performed in order to setup the communication session, this time using the different type of access network.

Returning to block 440, if the UE 100 determines that the second timer 106(2)/206(2)/306(2) is still running and has not expired, the process 400 may follow the "NO" route from block 440 to block 442, where the UE 100 determines whether a non-100 Trying SIP response has been received. If, at block 442, a non-100 Trying SIP response 126 is not received prior to expiration of the second timer 106(2)/206(2)/306(2), the process 400 may follow the "NO" route from block 442 back to block 414, where the UE 100 may continue to perform additional setup procedures while monitoring for a timeout of the first timer 106(1)/206(1)/306(1) and the second timer 106(2)/206(2)/306(2) or the occurrence of respective termination events, whichever occurs first. If, at block 442, a non-100 Trying SIP response 126 is received prior to expiration of the second timer 106(2)/206(2)/306(2), the process 400 may follow the "YES" route from block 442 to block 444, where the UE 100 may stop both the second timer 106(2)/206(2)/306(2) and the first timer 106(1)/206(1)/306(1) in response to receiving the non-100 Trying SIP response 126. In response to stopping both timers 106/206/306 at block 444, the UE 100 may finish setting up the communication session to establish the communication session over a telecommunications network.

Figure 5:
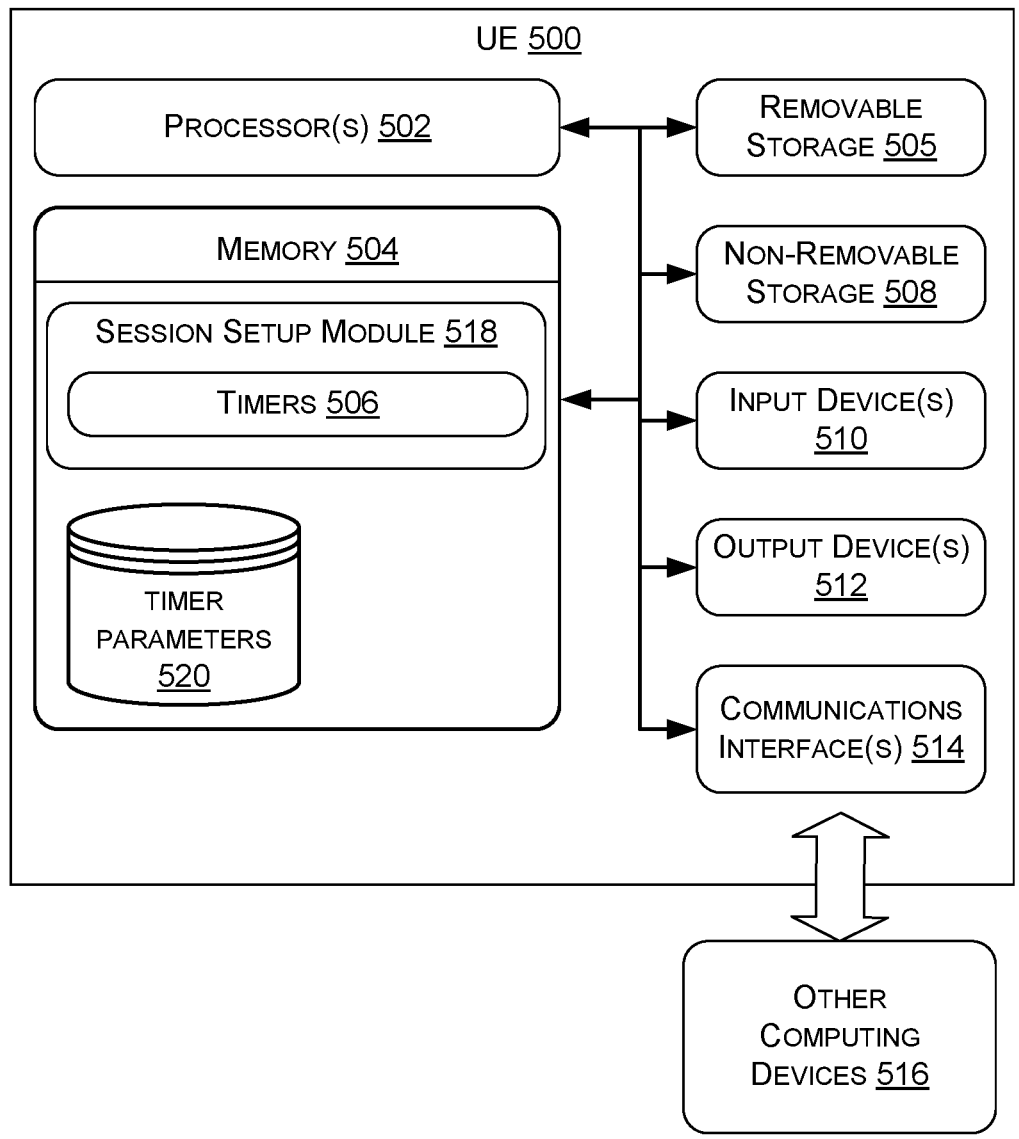
FIG. 5 is a block diagram of an example originating UE with logic to implement session setup timers, according to various embodiments.

FIG. 5 is a block diagram of an example originating UE 600 with logic to implement session setup timers 106/206/306, according to various embodiments. The UE 500 may be representative of the originating UE 100 of FIGS. 1A and 1B.

As shown, the UE 500 may include one or more processors 502 and one or more forms of computer-readable memory 504. The UE 500 may also include additional storage devices. Such additional storage may include removable storage 505 and/or non-removable storage 508.

The UE 500 may further include input devices 510 (e.g., a touch screen, keypad, keyboard, mouse, pointer, microphone, etc.) and output devices 512 (e.g., a display, printer, speaker, etc.) communicatively coupled to the processor(s) 502 and the computer-readable memory 504. The UE 500 may further include communications interface(s) 514 that allow the UE 500 to communicate with other computing devices 516 (e.g., IMS nodes) such as via a network (e.g., the IMS core, the P-CSCF nodes 102/202/302, the PSAP 104, etc.). The communications interface(s) 514 may facilitate transmitting and receiving wired and/or wireless signals over any suitable communications/data technology, standard, or protocol, as described herein. For example, the communications interface(s) 514 can comprise one or more of a cellular radio, a wireless (e.g., IEEE 802.1x-based) interface, a Bluetooth® interface, and so on. In some embodiments, the communications interface(s) 514 may include radio frequency (RF) circuitry that allows the UE 500 to transition between different RATs, such as transitioning between communication with a 5G NR RAT, a 4G LTE RAT and other legacy RATs (e.g., 3G/2G). The communications interface(s) 514 may further enable the UE 500 to communicate over circuit-switch domains and/or packet-switch domains.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 505 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 500. Any such computer-readable storage media may be part of the UE 500.

The memory 504 can include a session setup module 518 (i.e., computer-executable instructions (or logic) that, when executed, by the processor(s) 502, perform the various acts and/or processes disclosed herein. For example, the session setup module 518 can be configured to carry out the setup procedures described herein that can include various actions and message transmissions for setting up and establishing a communication session (e.g., an emergency call).

As shown in FIG. 5, the session setup module 518 is further configured to implement session setup timers 506, which may be similar to those session setup timers 106/206/306 described elsewhere herein.

The memory 504 can further be used to store timer parameters 520, such as trigger events, termination events, timer values, and/or fire actions associated with particular timers. Table 1 includes examples of timer parameters 520 that may be stored in memory of the originating UE 500. Although the timer parameters are illustrated as being stored locally on the UE 500, the UE 500 may be configured to access the timer parameters from a remote storage location, such as a Cloud-based service that maintains timer parameters and continually updates those parameters. For locally stored timer parameters, parameter updates may be pushed, periodically, to the UE 500 for storage in the memory 504.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A device comprising:
a processor; and
memory storing computer-executable instructions that, when executed by the processor, cause the device to:
receive input to establish a communication session, wherein the input represents an emergency short code to establish an emergency call;
setup the communication session, including:
sending a Session Initiation Protocol (SIP) request using a SIP INVITE method;
starting a first timer and a second timer in response to sending the SIP request, the first timer being configured to expire after a first period of time and to stop in response to the device receiving a 100 Trying SIP response, and the second timer being configured to expire after a second period of time different from the first period of time and to stop in response to the device receiving a SIP response other than the 100 Trying SIP response;
prior to expiration of the second timer, receiving the SIP response other than the 100 Trying SIP response; and
stopping the second timer in response to receiving the SIP response other than the 100 Trying SIP response; and
establish the communication session over a telecommunications network.

2. The device of claim 1, wherein setting up the communication session further includes:
prior to expiration of the first timer, receiving the 100 Trying SIP Response; and
stopping the first timer in response to receiving the 100 Trying SIP response.

3. The device of claim 1, wherein the SIP request is a first SIP request sent to a first proxy call session control function (P-CSCF) node, and wherein setting up the communication session further includes:
determining that the first timer has expired without the device having received the 100 Trying SIP response;
sending, to a second P-CSCF node, a second SIP request using the SIP INVITE method; and
restarting the first timer in response to sending the second SIP request.

4. The device of claim 3, wherein setting up the communication session further includes, prior to expiration of the first timer after restarting the first timer:
receiving the 100 Trying SIP response; and
stopping the first timer in response to receiving the 100 Trying SIP response.

5. The device of claim 3, wherein the SIP response other than the 100 Trying SIP response is received prior to expiration of the first timer after restarting the first timer, and wherein setting up the communication session further includes stopping the first timer in response to receiving the SIP response other than the 100 Trying SIP response.

6. The device of claim 3, wherein a From header field value in the second SIP request is set to Anonymous.

7. The device of claim 1, wherein the SIP response other than the 100 Trying SIP response comprises at least one of:
a 180 Ringing SIP response;
a 183 Session Progress SIP response; or
a 200 OK SIP response.

8. The device of claim 1, wherein the SIP response other than the 100 Trying SIP response originates from a public safety answering point (PSAP).

9. A method comprising:
receiving, by a device, input requesting to establish a communication session, wherein the input represents an emergency short code to establish an emergency call;
setting up, by the device, the communication session, including:
sending, by the device, a Session Initiation Protocol (SIP) request using a SIP INVITE method;
starting, by the device, a first timer and a second timer in response to sending the SIP request, the first timer being configured to expire after a first period of time and to stop in response to the device receiving a 100 Trying SIP response, and the second timer being configured to expire after a second period of time different from the first period of time and to stop in response to the device receiving a SIP response other than the 100 Trying SIP response;
prior to expiration of the second timer, receiving, by the device, the SIP response other than the 100 Trying SIP response; and
stopping, by the device, the second timer in response to receiving the SIP response other than the 100 Trying SIP response; and
establishing, by the device, the communication session over a telecommunications network.

10. The method of claim 9, wherein the SIP response other than the 100 Trying SIP response is received prior to expiration of the first timer, and wherein setting up the communication session further includes stopping the first timer in response to receiving the SIP response other than the 100 Trying SIP response.

11. The method of claim 9, wherein the SIP request is a first SIP request sent to a first proxy call session control function (P-CSCF) node, and wherein setting up the communication session further includes:
determining, by the device, that the first timer has expired without the device having received the 100 Trying SIP response;
sending, by the device to a second P-CSCF node, a second SIP request using the SIP INVITE method; and
restarting, by the device, the first timer in response to sending the second SIP request.

12. The method of claim 11, wherein setting up the communication session further includes, prior to expiration of the first timer after restarting the first timer:
receiving, by the device, the 100 Trying SIP response; and
stopping, by the device, the first timer in response to receiving the 100 Trying SIP response.

13. The method of claim 11, further comprising setting a From header field value in the second SIP request to Anonymous.

14. The method of claim 9, wherein the SIP response other than the 100 Trying SIP response comprises at least one of:
a 180 Ringing SIP response;
a 183 Session Progress SIP response; or
a 200 OK SIP response.

15. A device comprising:
a processor; and
memory storing computer-executable instructions that, when executed by the processor, cause the device to:
receive input to establish a communication session, wherein the input represents an emergency short code to establish an emergency call;
setup the communication session, including:
sending a Session Initiation Protocol (SIP) request using a SIP INVITE method;
starting a first timer and a second timer in response to sending the SIP request, the first timer being configured to expire after a first period of time and to stop in response to the device receiving a 100 Trying SIP response, and the second timer being configured to expire after a second period of time different from the first period of time and to stop in response to the device receiving a SIP response other than the 100 Trying SIP response; and
determining that the second timer has expired without the device having received the SIP response other than the 100 Trying SIP response;
halt setting up the communication session in response to determining that the second timer has expired; and
reattempt to setup the communication session using a different type of access network than a type of access network previously used by the device.

16. The device of claim 15, wherein the different type of access network comprises at least one of:
an access network of a legacy packet switched network;
an access network of a legacy circuit switched network; or
a WiFi access network.

17. The device of claim 15, wherein the SIP request is a first SIP request sent to a first proxy call session control function (P-CSCF) node, and wherein setting up the communication session further includes:
determining that the first timer has expired without the device having received the 100 Trying SIP response;
sending, to a second P-CSCF node, a second SIP request using the SIP INVITE method; and
restarting the first timer in response to sending the second SIP request.

18. The device of claim 17, wherein the device receives a list of P-CSCF nodes including the first P-CSCF node, the second P-CSCF node, and a third P-CSCF node, and wherein the computer-executable instructions, when executed by the processor, further cause the device to, in response to determining that the second timer has expired after restarting the first timer:
stop the first timer; and
refrain from sending a third SIP request to the third P-CSCF node.

19. The device of claim 17, wherein a From header field value in the second SIP request is set to Anonymous.

20. The device of claim 15, wherein the SIP response other than the 100 Trying SIP response comprises at least one of:
a 180 Ringing SIP response;
a 183 Session Progress SIP response; or
a 200 OK SIP response.

* * * * *